(12) United States Patent
Jameson

(10) Patent No.: US 7,624,049 B2
(45) Date of Patent: *Nov. 24, 2009

(54) FINANCIAL ACCOUNTING METHODS AND SYSTEMS TO ACCOUNT FOR ASSETS AND LIABILITIES

(75) Inventor: Joel Jameson, 940 Lundy La., Los Altos, CA (US) 94024-5940

(73) Assignee: Joel Jameson, Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/612,585

(22) Filed: Dec. 19, 2006

(65) Prior Publication Data

US 2007/0088637 A1     Apr. 19, 2007

Related U.S. Application Data

(63) Continuation-in-part of application No. 11/464,980, filed on Aug. 16, 2006.

(60) Provisional application No. 60/708,683, filed on Aug. 16, 2005.

(51) Int. Cl.
*G07B 17/00*     (2006.01)
*G07F 19/00*     (2006.01)

(52) U.S. Cl. .................................................... 705/30

(58) Field of Classification Search ................ None
See application file for complete search history.

(56) References Cited

U.S. PATENT DOCUMENTS

2002/0103730 A1 *  8/2002  Perley et al. ................. 705/30

| | | | |
|---|---|---|---|
| 2002/0111891 A1 | 8/2002 | Hoffman et al. | |
| 2002/0165743 A1 * | 11/2002 | Dahl-Sorensen et al. | 705/7 |
| 2003/0074211 A1 * | 4/2003 | Lun | 705/1 |
| 2003/0158811 A1 | 8/2003 | Sanders et al. | |
| 2004/0158479 A1 * | 8/2004 | Adhikari | 705/1 |
| 2005/0060251 A1 * | 3/2005 | Schwartz et al. | 705/35 |
| 2005/0125318 A1 | 6/2005 | Jameson | |
| 2008/0215386 A1 * | 9/2008 | Eder | 705/7 |

OTHER PUBLICATIONS

"Accounting Information Technology, and Business Solutions" by Anita S. Hollander, Eric L. Denna and J. Owen Cherrington., McGraw-Hill Companies Inc., 1996, Chapter 3 pp. 79-131.*

Joel Jameson, Comments on Preliminary Views: Conceptual Framework for Financial Reporting, Nov. 3, 2006, 15 pages, Cupertino, CA, US.

Joel Jameson, Comments on Preliminary Views: Conceptual Framework for Financial Reporting, Nov. 6, 2006, 14 pages, Cupertino, CA, US.

FASB, Statement of Financial Accounting Concepts No. 7: Using Cash Flow Information and Present Value in Accounting Measurements, Feb 2000, FASB, Norwalk, CT.

(Continued)

*Primary Examiner*—F. Zeender
*Assistant Examiner*—Mussa Shaawat
(74) *Attorney, Agent, or Firm*—Adam K. Sacharoff; Much Shelist

(57) ABSTRACT

A method to calculate true ex-ante operating income, via a present value calculation and posting in a double-entry bookkeeping framework based upon credits and debits, is disclosed. The ultimate object is a true ex-ante net income accounting measurement that better serves financial statements users.

8 Claims, 5 Drawing Sheets

OTHER PUBLICATIONS

Anthony, Robert, "We don't have the accounting concepts we need", Harvard Business Review, Jan/-Feb. 1987, pp. 75-83.

Barker, Richard "Reporting Financial Performance" Accounting Horizons, Jun. 2004, pp. 157-172.

Barth, Mary; Standard-Setters, Measurement Issues, and the Relevance of Research, ICAEW website, Dec. 2006, United Kingdom.

Nissim and Penman, Preliminary Draft Of White Paper No. Two: On The Application Of Fair Value Accounting, Aug. 2007, Columbia University, New York.

Previts and Merino, A history of accountancy in the United States: The cultural significance of accounting, 1998, pp. 175-297, Ohio State University Press, Columbus, OH.

* cited by examiner

Fig. 1

Income Statement

|   | [A] | [B] | [C] | [D] | [E] | [F] |
|---|---|---|---|---|---|---|
| [1] | Going Concern | | | | | |
| [2] | Operating Income | | | | | |
| [3] | Revenues | ⋱ | | | | |
| [4] | Total Revenues | | #.## | | | |
| [5] | Expenses | ⋱ | | | | |
| [6] | Total Expenses | | #.## | | | |
| [7] | Total Operating Income | | | #.## | | |
| [8] | Market Income (Expected) | | | | | |
| [9] | Asset Appreciations | ⋱ | | | | |
| [10] | Total Asset Appreciations | | #.## | | | |
| [11] | Asset Depreciations | ⋱ | | | | |
| [12] | Total Asset Depreciations | | #.## | | | |
| [13] | Favorable Liability Depreciations | ⋱ | | | | |
| [14] | Total Liability Depreciations | | #.## | | | |
| [15] | Unfavorable Liability Appreciations | ⋱ | | | | |
| [16] | Total Liability Appreciations | | #.## | | | |
| [17] | Total Market Income | | | #.## | | |
| [18] | Net Income (Total Going-Concern Earning-Power Income) | | | | #.## | |
| [19] | | | | | | |
| [20] | Forward-shift Operating Income (FSOI) | | | | #.## | |
| [21] | | | | | | |
| [22] | Market Moves | | | | | |
| [23] | Asset Gains | ⋱ | | | | |
| [24] | Total Asset Gains | | #.## | | | |
| [25] | Asset Losses | ⋱ | | | | |
| [26] | Total Asset Losses | | #.## | | | |
| [27] | Favorable Liability Gains | ⋱ | | | | |
| [28] | Total Liability Gains | | #.## | | | |
| [29] | Unfavorable Liability Losses | ⋱ | | | | |
| [30] | Total Liability Losses | | #.## | | | |
| [31] | Total Market Moves Income | | | | #.## | |
| [32] | | | | | | |
| [33] | Total Comprehensive Income | | | | | #.## |

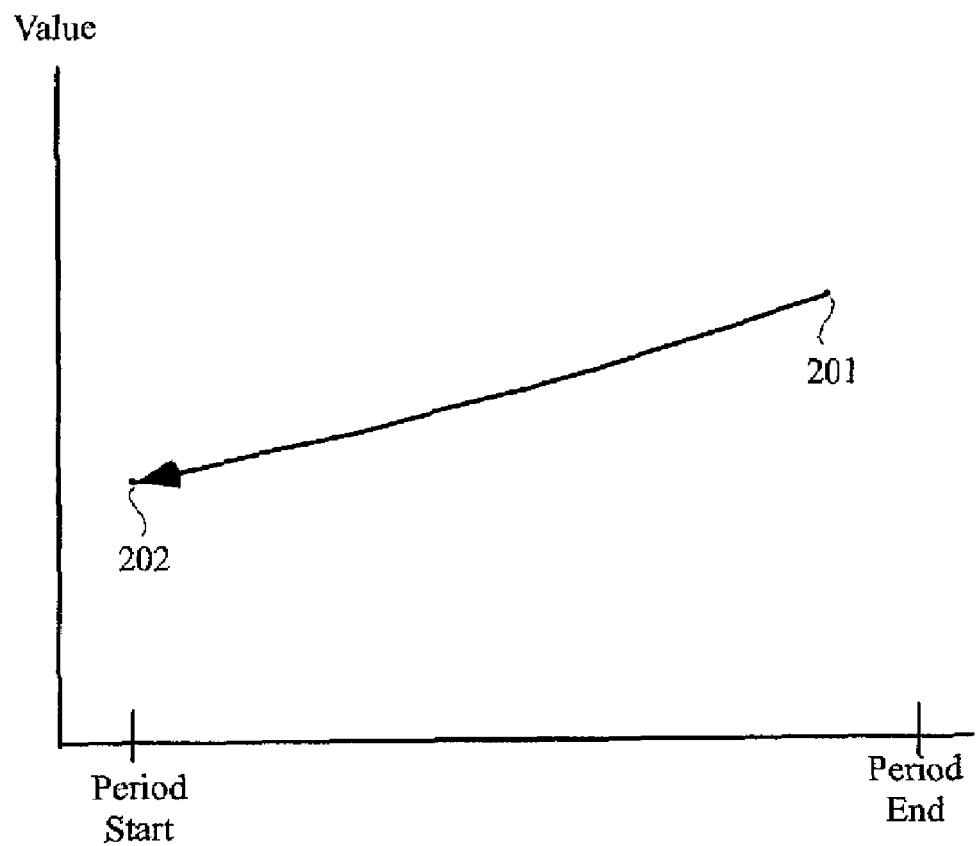

Fig. 4

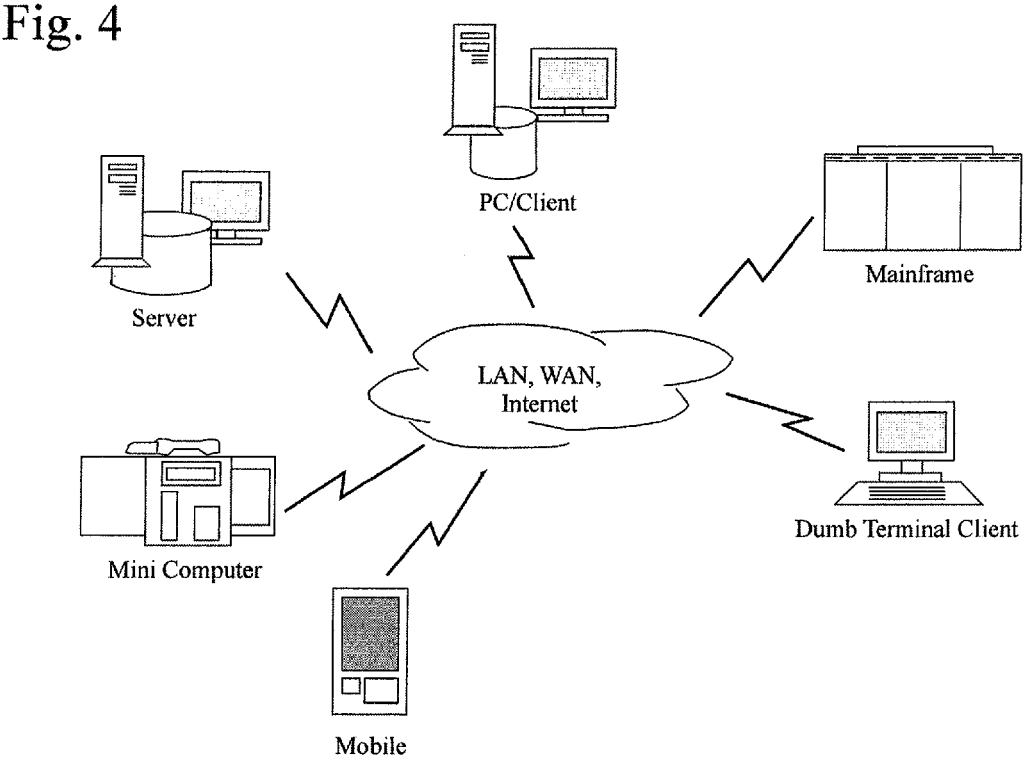

Fig. 7

2002 Credits and Debits

|  | [A] Date | [B] DebitAccount | [C] CreditAccount | [D] Amount |
|---|---|---|---|---|
| [1] | 31-Dec-01 | CashA | Shareholder EquityL | 10,000.00 |
| [2] | 30-Nov-02 | CashA | MiscRevR | 6,500.00 |
| [3] | 30-Nov-02 | MiscRevR | FSOI | 542.87 |
| [4] | 31-Dec-02 | PensionE | PensionL | 2,000.00 |
| [5] | 31-Dec-02 | FSOI | PensionE | 181.82 |
| [6] | 31-Jan-02 | CashA | CashAMM | 16.80 |
| [7] | 28-Feb-02 | CashA | CashAMM | 15.30 |
| [8] | 31-Mar-02 | CashA | CashAMM | 16.80 |
| [9] | 30-Apr-02 | CashA | CashAMM | 16.40 |
| [10] | 31-May-02 | CashA | CashAMM | 17.00 |
| [11] | 30-Jun-02 | CashA | CashAMM | 16.40 |
| [12] | 31-Jul-02 | CashA | CashAMM | 17.00 |
| [13] | 31-Aug-02 | CashA | CashAMM | 17.00 |
| [14] | 30-Sep-02 | CashA | CashAMM | 16.50 |
| [15] | 31-Oct-02 | CashA | CashAMM | 17.10 |
| [16] | 30-Nov-02 | CashA | CashAMM | 16.60 |
| [17] | 31-Dec-02 | CashA | CashAMM | 28.02 |
| [18] | 31-Dec-02 | CashAMM | CashAMI | 327.67 |
| [19] | 31-Dec-02 | PensionMI | PensionMM | 181.82 |

Discount Table

| | [A]<br>Date | [B]<br>Value |
|---|---|---|
| [1] | 31-Dec-01 | 1.00000 |
| ... | | |
| [32] | 31-Jan-02 | 1.00813 |
| ... | | |
| [60] | 28-Feb-02 | 1.01553 |
| ... | | |
| [91] | 31-Mar-02 | 1.02378 |
| ... | | |
| [121] | 30-Apr-02 | 1.03183 |
| ... | | |
| [152] | 31-May-02 | 1.04022 |
| ... | | |
| [182] | 30-Jun-02 | 1.04840 |
| ... | | |
| [213] | 31-Jul-02 | 1.05692 |
| ... | | |
| [244] | 31-Aug-02 | 1.06551 |
| ... | | |
| [274] | 30-Sep-02 | 1.07389 |
| ... | | |
| [305] | 31-Oct-02 | 1.08262 |
| ... | | |
| [335] | 30-Nov-02 | 1.09113 |
| ... | | |
| [366] | 31-Dec-02 | 1.10000 |

Fig. 8

2002 Income Statement

|  | [A] | [B] | [C] | [D] | [E] | [F] |
|---|---|---|---|---|---|---|
| [1] | Going Concern | | | | | |
| [2] | Operating Income | | | | | |
| [3] | Revenues | | | | | |
| [4] | RevMiscR | 5,957.13 | | | | |
| [5] | Total Revenues | | 5,957.13 | | | |
| [6] | Expenses | | | | | |
| [7] | PensionE | (1,818.18) | | | | |
| [8] | Total Expenses | | (1,818.18) | | | |
| [9] | Total Operating Income | | | 4,138.95 | | |
| [10] | Market Income (Expected) | | | | | |
| [11] | Asset Appreciations | | | | | |
| [12] | CashAMI | 327.67 | | | | |
| [13] | Total Asset Appreciations | | 327.67 | | | |
| [14] | Unfavorable Liability Appreciations | | | | | |
| [15] | PensionLMI | (181.82) | | | | |
| [16] | Total Liability Appreciations | | (181.82) | | | |
| [17] | Total Market Income | | | 145.85 | | |
| [18] | Net Income (Total Going-Concern Earning-Power Income) | | | | 4,284.80 | |
| [19] | | | | | | |
| [20] | Forward-Shift Operating Income (FSOI) | | | | 361.05 | |
| [21] | | | | | | |
| [22] | Market Moves | | | | | |
| [23] | Asset Losses | | | | | |
| [24] | CashAMM | (116.75) | | | | |
| [25] | Total Asset Losses | | (116.75) | | | |
| [26] | Favorable Liability Gains | | | | | |
| [27] | PensionLMM | 181.82 | | | | |
| [28] | Total Liability Gains | | 181.82 | | | |
| [29] | Total Market Moves Income | | | | 65.07 | |
| [30] | | | | | | |
| [31] | Total Comprehensive Income | | | | | 4,710.92 |

Fig. 9

2002 Balance Sheet

|  | [A]<br>Account | [B]<br>Assets | [C]<br>Liabilities |
|---|---|---|---|
| [1] | CashA | 16,710.92 | |
| [2] | PensionL | | 2,000.00 |
| [3] | Shareholder Equity | | 14,710.92 |
| [4] | Total | 16,710.92 | 16,710.92 |

FINANCIAL ACCOUNTING METHODS AND SYSTEMS TO ACCOUNT FOR ASSETS AND LIABILITIES

CROSS REFERENCE TO RELATED APPLICATIONS

The present application claims priority to previous patent application, Financial Accounting Methods And Systems To Account For Assets And Liabilities, filed as U.S. application Ser. No. 11/464,980 on Aug. 16, 2006, which claims priority to U.S. Provisional Application 60/708,683 filed Aug. 16, 2005, both of which are hereby incorporated in their entirety by reference.

BACKGROUND TECHNICAL FIELD

The present invention regards financial accounting methods and computer systems to account for assets, liabilities, and operations in a double-entry bookkeeping framework based upon credits and debits.

COPYRIGHT NOTICE

This application includes a computer program source code listing written in C++ for Microsoft Visual C++, Version 6.0, Visual Studio.

This computer program source code listing is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND DESCRIPTION OF PRIOR ART

Because of confusion in the prior art (apart from U.S. application Ser. No. 11/464,980) regarding ex-post and ex-ante incomes, it is helpful to initially define these two terms. Ex-post income is income measured at the end of a period and equals the change in net assets during the period. Ex-ante income is measured at the beginning of a period and equals the mathematically expected value of consumption that could occur during the upcoming period, conditional upon the capital base remaining intact and constant. For further clarification, see J. R. Hicks' *Value and capital: An inquiry into some fundamental principles of economic theory* (2nd ed.); Oxford: Clarendon Press; 1946.

In co-owned U.S. application Ser. No. 11/464,980, the calculated net income is undesirably slightly inflated. This occurs because it is implicitly assumed that operating income is ex-ante income that can be paid as dividends, while leaving the Company positioned to expect to have the same operating income in the next period. By itself this assumption is valid. However, when operating income is combined with ex-ante Market Income to yield net income, the resulting net income is not true ex-ante income. This is because the asset and liability values used to calculate Market Income include operating income. If the operating income were paid as dividends, the resulting capital base would be insufficient to generate the estimated Market Income. So, for example, suppose a Company with no asset or liabilities, but with $6500 revenue late in the accounting period. Per U.S. application Ser. No. 11/464,980, the 6500 value would appear as Operating Income, and a value based upon the 6500 would appear as part of Market Income. But adding these two values yields a net income greater than 6500—more than the Company can pay.

SUMMARY OF THE INVENTION

Accordingly, besides the objects and advantages of the present invention described elsewhere herein, the objects and advantages of the present invention are to develop an improvement on U.S. application Ser. No. 11/464,980 so that the resulting net income is a truer ex-ante income.

Specifically, the object is an income statement as shown in FIG. 1, in which net income is a truer ex-ante income. This is accomplished by converting all revenue (and expense) account postings into start-of-the-accounting-period present values. So, for example, suppose a late-accounting period posting as represented by Point 201 of FIG. 2. The present value of this posting is calculated (represented by Point 202) and this present value is included in the revenue (or expense) of section of the income statement. The resulting operating income is ex-ante income that immediately could be paid as a dividend, and assuming that the status quo is maintained and operations repeated, could be paid periodically at the end of each future accounting period. The previous problem of calculating Market Income based upon asset and liability values that include operating income is resolved, since the asset and liability values no longer include any current operating income.

In order to maintain the calculation of comprehensive income and maintain general control, value reductions resulting from present value conversion appear in a Forward-shift Operating Income (FSOI) line of the income statement. When converting revenue (or expense) account postings into present values, the values are necessarily reduced. Such value reduction is represented by the vertical-distance drop from Point 201 to 202 of FIG. 2. The FSOI line of the income statement shows the aggregation of such value reductions, as shown as Row 20 of FIG. 1

Yet additional objects and advantages will become apparent from a consideration of the ensuing description and drawings.

The basis for achieving these objects and advantages, which will be rigorously defined hereinafter, is accomplished by programming one or more computer systems as disclosed. The present invention can operate on most, if not all, types of computer systems. A computer system, programmed as disclosed herein, constitutes one embodiment of the present invention.

BRIEF DESCRIPTION OF THE DRAWINGS

The invention will be more readily understood with reference to the accompanying drawings, wherein:

FIG. 1 shows a general income statement generated by the present invention;

FIG. 2 shows converting a revenue (or expense) account posting to a start-of-the-accounting-period present value;

FIG. 3 shows the Forward-shift Operating Income (FSOI) account type used by the present invention;

FIG. 4 shows a possible computer system on which the present invention can operate;

FIG. 7 shows credits and debits generated in the tutorial example of the present disclosure;

FIG. 8 shows the income statement generated in the tutorial example of the present disclosure; and FIG. 9 shows the balance sheet generated in the tutorial example of the present disclosure.

DETAILED DESCRIPTION OF THE INVENTION

Introduction

Figures 5, 6:
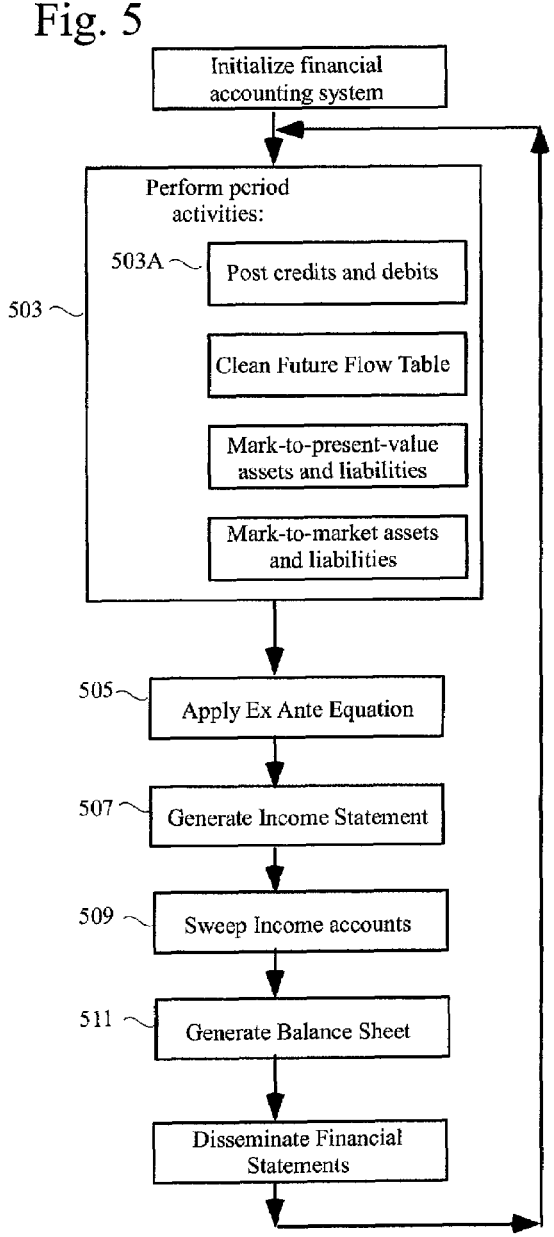
FIG. 5 shows the sequence of steps typically employed when using the present invention in conjunction with U.S. application Ser. No. 11/464,980.
FIG. 6 shows a discount table used in the tutorial example to convert revenue (and expense) account postings into present values.

This disclosure employs the definitions and nomenclature of U.S. application Ser. No. 11/464,980. The capitalized term "Company" refers to the entity for whose accounts and financial statements are under the management of the present invention. The Company is assumed to have a standard r used for present value analysis and such an r is termed "Company-r." The capitalized term "User" refers to a person, or computer system, who operates the present invention on behalf of the Company. Accounts ending in "A" and "L" are asset and liability accounts respectively; accounts ending in "R" and "E" are revenue and expense accounts respectively; accounts ending in MI and MM are Market Income and Market Moves accounts respectively. Ex-ante income is synonymous with going-concern earning-power income.

The object is a net income measurement that is a truer ex-ante income, as compared with the net income calculated by U.S. application Ser. No. 11/464,980. As previously discussed, this is accomplished by converting revenue (and expense) account postings into present values. In essence, the theoretical split of the Company into an operations part and an asset/liability holding part of U.S. application Ser. No. 11/464,980 is made more severe by asking and answering the following question: how should ex-ante operating income be determined assuming no asset and liability holdings—including no holdings of current income?

The implementation and operation of the present invention is demonstrated by use of a "tutorial example" covering a single accounting period, year 2002. This tutorial example uses elements from the extended example in U.S. application Ser. No. 11/464,980, but focuses on calculating operating income. Company-r equals 0.10. Naturally, any Company that implements the present invention sets Company-r as deemed appropriate. All elements disclosed in U.S. application Ser. No. 11/464,980 are not discussed here, but are assumed to be appropriately employed. The present invention is best considered as an improvement to U.S. application Ser. No. 11/464,980. The tutorial example is only illustrative, and should not be construed to in any way limit or bind the interpretive scope of the present invention.

Afterwards, source code that demonstrates key aspects of the present invention is introduced and miscellaneous additional considerations are discussed.

Forward-shift Operating Income (FSOI) Account

As shown in FIG. 3, the present invention utilizes an addition new type of account, termed the Forward-shift Operating Income (FSOI) account. Generally, there is a single FSOI account. For each revenue (and expense) account posting, a present value is calculated. The difference between the original posting value and the calculated present value is termed "Shift-value", because it represents a change in value resulting from a point-in-time measurement shift. This Shift-value is posted as a credit or debit to reduce the revenue (or expense) account posting value. The offsetting debit or credit is posted to the FSOI account.

The User makes four basic types of postings that entail the FSOI account:

When a credit is made to a revenue account, it is posted in the normal fashion. Afterwards, the present value of the credit, from a start-of-the-accounting-period perspective, is calculated. The Shift-value, i.e. difference between the original credit and its present value, is then posted as a reversing debit to the revenue account and as a credit to the FSOI account.

When a debit is made to an expense account, it is posted in the normal fashion. Afterwards, the present value of the debit is calculated. The Shift-value is then posted as a credit to the expense account and as a debit to the FSOI account.

When a debit is made to a revenue account, it is posted in the normal fashion. Afterwards, the present value of the debit is calculated. The Shift-value is then posted as a credit to the revenue account and as a debit to the FSOI account.

When a credit is made to an expense account, it is posted in the normal fashion. Afterwards, the present value of the credit is calculated. The Shift-value is then posted as a debit to the expense account and as a credit to the FSOI account.

When the income statement is generated, the FSOI account balance is shown below the net income line and is included as a component of comprehensive income. Like revenue and expense accounts, a credit balance is shown as something favorable, while a debit balance is shown as something unfavorable.

Implementation and Operation

The present invention can operate on most, if not all, types of computer systems. FIG. 4 shows a possible computer system, which itself is a collage of possible computer systems on which the present invention can operate. Note that the invention can operate on a stand-alone hand-held mobile computer, a stand-alone PC system, or an elaborate system consisting of mainframes, mini-computers, and servers—all connected via LANs, WANs, and/or the Internet. The invention best operates on a computer system that provides each individual user with a GUI (Graphical User's Interface) and with a mouse/pointing device, though neither of these two components is mandatory.

The computer system as shown in FIG. 4, or variations, requires proper programming to execute the present invention, though this is readily accomplished given this teaching that includes computer program source code to execute and demonstrate key aspects of the present invention.

FIG. 5 shows the sequence of steps that are executed to employ the present invention in conjunction with U.S. application Ser. No. 11/464,980. Only those steps which are discussed in the present disclosure have identification numbers. Each revenue and each expense account posting requires a present value calculation to yield a Shift-value that is posted to the FSOI account. Calculating such present values and generating FSOI postings can be performed at three possible locations in FIG. 5:

As part of Box 503A

As part of Box 503

Between Boxes 503 and 507.

Whichever location is selected, exactly one FSOI posting is needed for each independent revenue (and expense) account posting.

The tutorial example of the present invention will focus on a revenue posting and a Future Flow expense posting. The Company is assumed formed late in 2001. The shareholders contribute $ 10,000 in cash. Accordingly, CashA is debited and shareholder equity is credited, as shown in FIG. 7, Row 1.

With the Company-r of 10%, present value discount factors are as shown in FIG. 6. For convenience, transactions occur at the end of the month.

TUTORIAL EXAMPLE

Year 2002 Period

In Step 503A, suppose that the Company receives $6500 revenue on 30 Nov. 2002. As in the prior art, this triggers a 6500 debit to CashA and a 6500 credit to a revenue account, say account MiscRevR. After this posting, the Shift-value is calculated as:

Shift-value=6500−6500/1.09113=542.87.

where 1.09113 equals the value in Cell B335 of FIG. 6. To adjust the posting to MiscRevR to equal its present value, 542.87 is debited to MiscRevR and credited to the FSOI account. (These postings appear in Rows 2 and 3 of FIG. 7.)

On 31 Dec. 2002, the Company compensates its employees with a $2000 present-value pension. As in U.S. application Ser. No. 11/464,980, this posting is handled by the PostFFT function that makes entries in the Future Flow Table. In addition, as in U.S. application Ser. No. 11/464,980, this triggers a 2000 credit to liability account PensionL and a 2000 debit to expense account PensionE. After this posting, the Shift-value is calculated as:

Shift-value=2000−2000/1.10000=181.82.

where 1.10000 equals the value in Cell B366 of FIG. 6. To adjust the posting to PensionE to equal its present value, 181.82 is credited to PensionE and debited from the FSOI account. (These postings appear in Rows 4 and 5 of FIG. 7.)

Additional revenue (and expense) account postings are handled similarly.

Assuming that cash earns 2% annually, as is the case in U.S. application Ser. No. 11/464,980, and assuming that interest payments are received monthly by the Company, the resulting CashA debits and CashAMM credits are as shown in Rows 6 through 17 of FIG. 7. Note that the larger value for December ($28.02) results from the $6500 revenue that occurs at the end of November. (Total interest receipts are 210.92.)

In Step 505, the Ex-ante Equation is applied to each asset and liability listed in the Asset and Liability Table. This triggers credits and debits to the Market Moves and Market Income accounts, as shown in the bottom two Rows of FIG. 7.

In Step 507, the income statement is generated, and the results are as shown in FIG. 8. Total operating income of $4138.95 is ex-ante income. This is because the Company could conceivably borrow this amount (at a Company-r interest rate), pay the borrowed funds as dividends on 31 Dec. 2002 and then if the status quo is maintained and operations repeated, pay the loan on 30 Nov. 2003 and immediately settle the 31 Dec. 2003 pension liability when it arises. Per the analysis of U.S. application Ser. No. 11/464,980 and associated references, Market Income is ex-ante income. Hence, operating income plus Market Income equal ex-ante net income. This $4284.81 could be paid to shareholders, with the expectation that at the end of 2003, 4284.81 could again be paid, while leaving intact both net assets and the expectation that at the end of 2004, 4284.81 could yet again be paid as dividends.

The FSOI account credit of $542.87 and debit of $181.82 results in a $361.05 credit balance. This credit balance is shown on the FSIO line of the income statement as something favorable. (Were the FSOI balance a debit, the FSIO line of the income statement would show the FSIO account balance as unfavorable.)

The summation of net income, FSOI, and Market Moves income equals total comprehensive income, as shown in FIG. 8.

In Step 509, the FSOI account balance, as well as the other income statement accounts, is swept into the Shareholders' Equity account. A credit FSOI balance is swept via a FSOI debit and a credit to the Shareholders' Equity account. A debit FSOI balance is swept via a FSOI credit and a debit to the Shareholders' Equity account.

In Step 511, the balance sheet is generated as discussed in U.S. application Ser. No. 11/464,980 (See FIG. 9).

In conclusion, by converting revenue (and expense) account postings to start-of-the-accounting-period present values, the resulting net income is a superior ex-ante income measurement. Given the method disclosed here, such a net income is calculated in a double-entry accounting context, while preserving the calculation of comprehensive income. (Had only U.S. application Ser. No. 11/464,980 method been applied to the tutorial example, net income would have been overstated by the balance of the FSOI account, in the amount of $361.05.)

Source Code Introduction

Source code to perform essential aspects of the present invention is shown below. This source code consists of two class member functions. GenDiscountTable generates the Discount Table. PostRevenueExpense calculates present values, makes revenue (and expense) account postings, and generates FSOI account postings. To facilitate ease of comprehension, discount factors used to determine present values and in turn Shift-values are based upon look-ups in the Discount Table. In an actual implementation of the present invention, discount factors could be computed on an ad hoc, as needed, basis. The two member functions are added to the EAE_AS Class (Ex-ante Equation Accounting System) of U.S. application Ser. No. 11/464,980, which includes the Post member function. Rather than directly calling Post as in U.S. application Ser. No. 11/464,980, PostRevenueExpense should be called: it in turns calls the Post function and, when necessary, generates and posts the appropriate FSOI related credits and debits. CtTo_DdMmmYy converts an integer into a CString value that contains a date.

Source code to generate an income statement with a FSOI line and sweep the FSOI account is not provided, because such functionality analogously is done in the prior art.

```
void EAE_AS::GenDiscountTable(double companyR)
{
    discountTable.nRow = 0;
    for(long i=0; i<366; i++)
        discountTable.Append(CtTo_DdMmmYy(36891 + i), pow(1 + companyR, i/365.0));
}
void EAE_AS::PostRevenueExpense(CString date, CString debit, CString credit, double amount)
{
    Post( debit, credit, amount );
    double shiftvalue = 0;
    for( long i=1; i<366; i++ )
        if(date == discountTable.date[i])
        {
            shiftValue = amount − amount/discountTable.value[i];
            break;
        }
    if(HasRight(Credit, "R"))
        Post(credit, "FSOI", shiftValue);
```

-continued

```
    if(HasRight(debit, "E"))
        Post("FSOI", debit, shiftValue);
    if(HasRight(credit, "E"))
        Post(credit, "FSOI", shiftValue);
    if(HasRight(debit, "R"))
        Post("FSOI", debit, shiftValue);
}
void EAE_AS::Post(CString debit, CString credit, double val)
{
    // same as in US App. 11/464,980
}
```

CONCLUSION, RAMIFICATIONS, AND SCOPE

While the above description contains many particulars, these should not be construed as limitations on the scope of the present invention; but rather, as an exemplification of one preferred embodiment thereof. As the reader who is skilled in the invention's domains will appreciate, the invention's description here is oriented towards facilitating ease of comprehension. Such a reader will also appreciate that the invention's breadth of scope can be improved by applying both prior-art techniques and readily apparent improvements.

Many variations and many add-ons to the preferred embodiment are possible. Examples of variations and add-ons include, without limitation:

Rather than calculating present values for each and every revenue (and expense) account posting, an income statement could be generated as described in U.S. application Ser. No. 11/464,980. Afterwards, each operating-income-statement-line value could be discounted, assuming that the value represents a single aggregate-value posting that occurs mid-way in the accounting period. Given the discounted value, the Shift-value could be determined, and in turn the FSOI account balance estimated and inserted in the income statement.

Rather than generating a full income statement as shown here, the income statement could be truncated to only totaling net income, and omitting both the Forward-shift Operating Income (FSOI) total and the Market Moves section.

Furthermore, as the reader who is skilled in the invention's domains will appreciate, public policy, as dictated by either legislators and/or accounting boards, may eventually prescribe how the present invention is implemented and used. Such policy might not be directly aligned with the invention as presented here, but would nevertheless constitute a variation of the preferred embodiment of the present invention.

I claim:

1. A computer implemented financial accounting method, implemented on a computer usable medium having a computer readable program code embodied therein, said computer readable program code adapted to be executed to implement a method for generating and outputting an income statement, said method comprising:

providing a computer system, wherein the system comprises the computer usable medium with the computer readable program code being executed to perform the following steps:

electronically receiving, at the computer usable medium, at least one credit and one debit posting, said at least one credit and one debit posting comprising an identification of an account to be credited, an identification of an account to be debited, and a posting value to be credited to said account to be credited and to be debited to said account to be debited;

automatically updating at least one position account based upon said posting value to be credited to said account to be credited and to be debited to said account to be debited, said at least one position account being either an asset and/or a liability account;

automatically updating at least one revenue or expense account based upon said posting value to be credited to said account to be credited and to be debited to said account to be debited;

automatically calculating a start-of-period present value of said posting value to be credited to said account to be credited and to be debited to said account to be debited;

automatically calculating a Shift-value defined as being said posting value to be credited to said account to be credited and to be debited to said account to be debited minus said start-of-period present value;

automatically posting said Shift-value to said at least one revenue or expense account;

automatically posting said Shift-value to an Forward-shift Operating Income account;

obtaining a balance for said at least one position account;

obtaining an r value, wherein r is an expected rate of return;

automatically using an Ex Ante Equation stored in the computer readable program code to automatically calculate at least one Market Income value based upon said balance of said at least one position account and based upon said obtained r value, wherein said Ex Ante Equation being:

Market Income=(obtained balance for said at least one position account)*(1−[1/(1+r)]); and the computer readable program code generating and outputting an income statement, said outputted income statement containing balance of said at least one revenue or expense account and/or a value that subsumes said balance of said at least one revenue or expense account, said outputted income statement also containing either said at least one Market Income value and/or a value that subsumes said at least one Market Income value.

2. The computer implemented financial accounting method according to claim 1 further comprising:

making data contained in said outputted income statement available for a Consumer to view using an internet connection.

3. The computer implemented financial accounting method according to claim 1 further comprising:

using an internet connection to access data contained in said outputted income statement.

4. The computer implemented financial accounting method according to claim 1 further comprising:

updating both at least one Market Income account and at least one Market Moves account based upon said calculated at least one Market Income value.

5. A computer implemented financial accounting method implemented on a computer usable medium having a computer readable program code embodied therein, said computer readable program code adapted to be executed to implement a method for generating and outputting an income statement, said method comprising:

providing a computer system, wherein the system comprises the computer usable medium with the computer readable program code being executed to perform the following steps:

electronically receiving, at the computer usable medium, at least one credit and one debit posting, said at least one credit and one debit posting comprising an identification of an account to be credited, an identification of an account to be debited, and a posting value to be credited to said account to be credited and to be debited to said account to be debited;

automatically updating at least one position account based upon said posting value to be credited to said account to be credited and to be debited to said account to be debited, said at least one position account being either an asset and/or a liability account;

automatically updating at least one revenue or expense account based upon said posting value to be credited to said account to be credited and to be debited to said account to be debited;

automatically calculating a start-of-period present value of said posting value to be credited to said account to be credited and to be debited to said account to be debited;

automatically calculating a Shift-value defined as being said posting value to be credited to said account to be credited and to be debited to said account to be debited minus said start-of-period present value;

automatically posting said Shift-value to said at least one revenue or expense account;

automatically posting said Shift-value to an Forward-shift Operating Income account;

obtaining a balance for said at least one position account;

obtaining an r value, wherein r is an expected rate of return;

using an Ex Ante Equation stored in the computer readable program code to automatically calculate at least one Market Income value based upon said balance of said at least one position account and based upon said obtained r value, wherein said Ex Ante Equation being:

Market Income=(obtained balance for said at least one position account)*(1−[1/(1+$r$)]); and receiving, electronically, an income statement, said received income statement containing balance of said at least one revenue or expense account and/or a value that subsumes said balance of said at least one revenue or expense account, said outputted income statement also containing either said at least one Market Income value and/or a value that subsumes said at least one Market Income value.

6. The computer implemented financial accounting method according to claim 5 further comprising:

making data contained in said outputted income statement available for a Consumer to view using an internet connection.

7. The computer implemented financial accounting method according to claim 5 further comprising:

using an internet connection to access data contained in said received income statement.

8. The computer implemented financial accounting method according to claim 5 further comprising:

updating both at least one Market Income account and at least one Market Moves account based upon said calculated at least one Market Income value.

* * * * *